G. W. BRADFORD.
Buckles.
No. 152,455. Patented June 30, 1874.
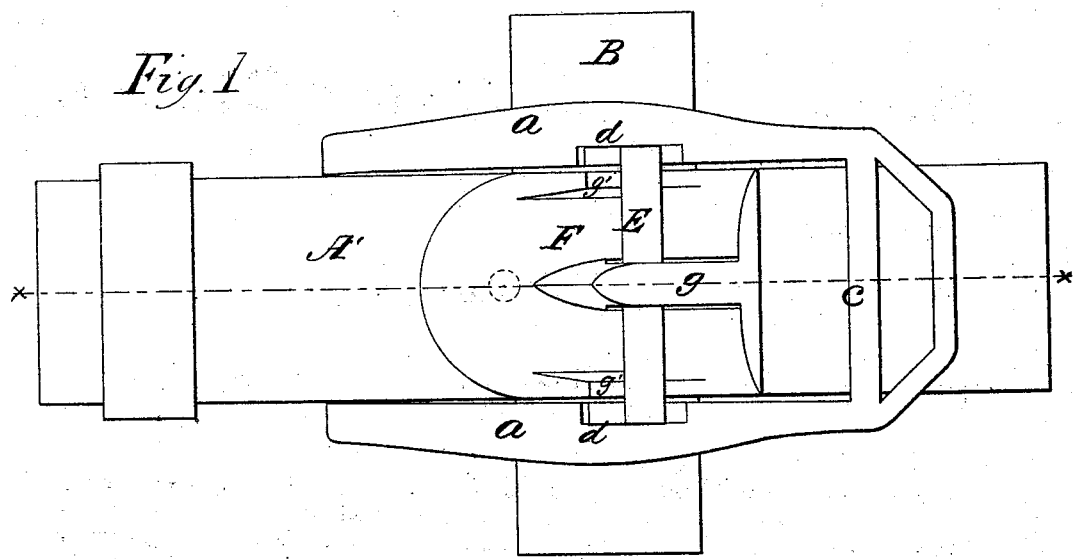
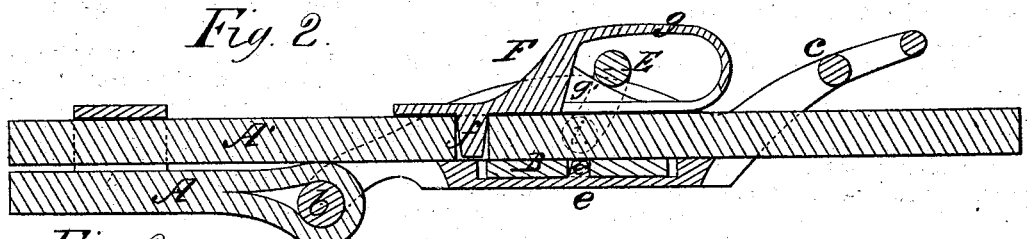
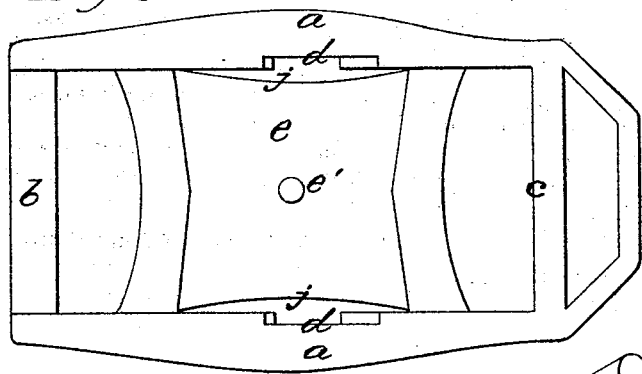
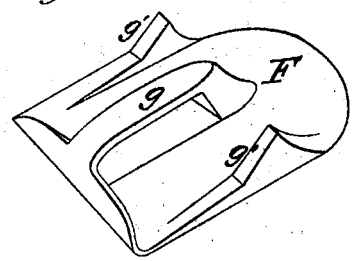
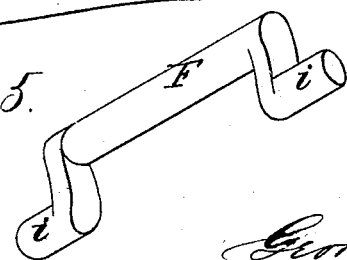
WITNESSES
Mary J. Utley.
Geo. E. Upham.
INVENTOR
George W. Bradford
By Chipman Hosmer & Co
ATTORNEYS.
AM. PHOTO-LITHOGRAPHIC CO. N.Y. (OSBORNE'S PROCESS.)

UNITED STATES PATENT OFFICE.

GEORGE W. BRADFORD, OF LA SALLE, MICHIGAN.

IMPROVEMENT IN BUCKLES.

Specification forming part of Letters Patent No. 152,455, dated June 30, 1874; application filed April 4, 1874.

*To all whom it may concern:*

Be it known that I, GEORGE W. BRADFORD, of La Salle, in the county of Monroe and State of Michigan, have invented a new and valuable Improvement in Buckles; and I do hereby declare that the following is a full, clear, and exact description of the construction and operation of the same, reference being had to the annexed drawings making a part of this specification, and to the letters and figures of reference marked thereon.

Figure 1 of the drawing is a representation of a plan view of my buckle, and Fig. 2 is a sectional view. Figs. 3, 4, and 5 are detail views of the same.

This invention has relation to harness-buckles; and it consists in a wedged clamping-plate connected to the pivoted bale by means of an oblong loop, which will prevent a casual detachment of said plate from the buckle, as will be hereinafter explained.

In the annexed drawings, Figs. 1 and 2, I have represented tug-straps A A′, and a back-band-strap, B, applied to the improved buckle. The frame of this buckle consists of two arched side bars, $a\ a$; a cross-bar, $b$, to which the tug A is permanently secured; a loop and cross-bar, $c$, beneath which the tug-strap passes and a flat depressed floor, $e$, on which a stud or tongue, $e'$, is formed. F designates a clamp-plate having inclined planes or wedges $g'\ g'$ formed on it. This plate is provided with a stud or tongue, $f$, and also with an oblong loop, $g$, through which latter the cross-bar of the bale E passes, and in which this part of the bale is allowed to play freely. The loop $g$ connects the clamping-plate E to the bale in such manner that the former will not be casually detached from the buckle, but may be detached when the straps A, A′, and B are removed.

What I claim as new, and desire to secure by Letters Patent, is—

The looped clamping-plate F, in combination with the pivoted bale E and buckle-frame, substantially as described.

In testimony that I claim the above I have hereunto subscribed my name in the presence of two witnesses.

GEORGE WITHINGTON BRADFORD.

Witnesses:
   J. D. ROUAN,
   CHAS. A. GOLDEN.